Patented Mar. 20, 1934

1,951,364

UNITED STATES PATENT OFFICE 1,951,364

MANUFACTURE OF DICARBOXYLIC ACID CHLORIDES

Lucas P. Kyrides, Webster Groves, Mo., assignor, by mesne assignments, to Monsanto Chemical Company, a corporation of Delaware No Drawing. Application March 24, 1932, Serial No. 601,062

6 Claims. (Cl. 260—123)

This invention relates to the manufacture of dicarboxylic acid chlorides such, for example, as phthalyl chloride and succinyl chloride and it has particular application to a method of preparing these acid chlorides from their anhydrides.

Heretofore, it has been proposed to manufacture phthalyl chloride by reacting phthalic anhydride with phosphorus pentachloride. This method presents many disadvantages, among which may be mentioned the cost of phosphorus pentachloride, the dangers and difficulties incident to its use, as well as the formation and disposal of by-product phosphorus oxychloride.

It has been recognized heretofore that thionyl chloride reacts with certain acid anhydrides to form the corresponding acid chlorides. Thus, for example, acetic anhydride may be caused to react with thionyl chloride to form acetyl chloride; sulphur dioxide being formed as a by-product (see, for example, Journal of the American Chemical Society, vol. 50, page 148). In these reactions the presence of small amounts of anhydrous acid reacting metallic salts such as zinc chloride, aluminum chloride, etc., have been found to facilitate the reaction.

According to the literature, certain anhydrides fail to react with thionyl chloride to form the acid chloride. Thus, for example, when thionyl chloride is refluxed with phthalic anhydride no phthalyl chloride is formed even though activating agents, such as aluminum chloride, are employed.

I have now found that when phthalic anhydride is heated with thionyl chloride above the normal atmospheric reflux temperature of the mixture, phthalyl chloride is formed in good yields. The elevated temperature may be obtained by effecting the reaction of the mixture at superatmospheric pressure or preferably by adding thionyl chloride slowly to molten phthalic anhydride.

One method of practicing my invention consists in adding thionyl chloride over a period of five hours to molten phthalic anhydride maintained at approximately 200°–240° C. and preferably containing a small quantity (.5% by weight) of an acid reacting metallic salt, such, for example, as zinc chloride. In order to assure completion of the reaction a small excess of thionyl chloride, for example 5%, should be added. The molten phthalic anhydride can be agitated advantageously during the course of the reaction and the heating and agitation continued for two hours after all of the thionyl chloride has been added.

The reaction product is distilled if desired and thereafter cooled whereby a small amount of unreacted phthalic anhydride, if present, crystallizes and is separated conveniently by filtration or decantation.

The reaction involved may be represented as follows:

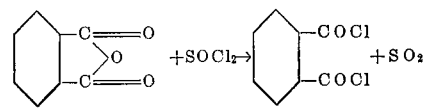

Succinyl chloride may be made in an analogous manner.

Obviously, the temperature conditions may be varied. Similarly, the quantity, as well as the nature of the catalyzing substance may be varied. The general catalyzing substances employed are the same as those employed in analogous reactions wherein acids or acid anhydrides are reacted with thionyl chloride to form the corresponding acid chlorides. The presence of these catalyzing substances are not essential for the purpose of effecting the reaction. However, in general the reaction proceeds at a relatively lower temperature and at an increased rate when such catalyzing substances are present. If desired, the reaction may be effected by adding all of the thionyl chloride and subjecting the mixture to a superatmospheric pressure while allowing the SO₂ formed to escape. In general this procedure is not as satisfactory since it requires pressure equipment and offers the usual operating disadvantages. Moreover, the reaction proceeds smoothly and in very good yields at atmospheric pressure by adding the thionyl chloride slowly to molten anhydride.

Other ortho dicarboxylic acid chlorides of benzene may be prepared in an analogous manner. Thus, for example, chlor phthalic anhydride may be caused to react with thionyl chloride to form the corresponding chlor phthalyl chloride. Similarly, tetra chlor phthalic anhydride may be caused to react with thionyl chloride under similar conditions to form tetra chlor phthalyl chloride.

From the foregoing description, it will be apparent that the present invention affords a convenient method of preparing acid chlorides of ortho dicarboxylic benzene derivatives as well as of succinic acid, which does not involve the disposal of objectionable by-products, which may be effected in ordinary equipment and which gives good yields of an easily purifiable product.

What I claim is:

1. The method which consists in reacting thionyl chloride with molten phthalic anhydride whereby phthalyl chloride and sulfur dioxide are formed.

2. The method which consists in reacting a material selected from a group consisting of the following: succinic anhydride and a phthalic anhydride, with thionyl chloride at a temperature of the anhydride of at least 200° C. and below the thermal decomposition temperature of the products formed whereby the corresponding acid chloride and sulfur dioxide are formed.

3. The method as defined in claim 2 and further characterized in that the reaction is effected in the presence of an anhydrous acid reacting metal salt.

4. The method which consists in adding thionyl chloride to a material selected from a group consisting of the following: phthalic anhydride and succinic anhydride, while maintaining said anhydride in a molten condition whereby the corresponding acid chloride and sulfur dioxide are formed.

5. The method as defined in claim 4 and further characterized in that the reaction mixture contains a small amount of an anhydrous acid reacting metal salt.

6. The method which consists in adding thionyl chloride to molten phthalic anhydride, containing an anhydrous acid reacting metal salt while maintaining the temperature at approximately 200° to approximately 240° C. whereby sulfur dioxide and phthalyl chloride are formed.

LUCAS P. KYRIDES.